(12) United States Patent
Wang et al.

(10) Patent No.: US 11,835,348 B2
(45) Date of Patent: *Dec. 5, 2023

(54) ADVANCED TRIP PLANNING FOR AUTONOMOUS VEHICLE SERVICES

(71) Applicant: Waymo LLC, Mountain View, CA (US)

(72) Inventors: Ben Qingzhou Wang, San Jose, CA (US); Salil Pandit, Mountain View, CA (US); Clement Wright, San Francisco, CA (US); Nirmal Patel, Sunnyvale, CA (US); Saksiri Tanphaichitr, Palo Alto, CA (US); Mishika Vora, Hayward, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,628

(22) Filed: Mar. 24, 2022

(65) Prior Publication Data

US 2022/0214180 A1 Jul. 7, 2022

Related U.S. Application Data

(63) Continuation of application No. 16/379,934, filed on Apr. 10, 2019, now Pat. No. 11,313,688.

(51) Int. Cl.
*G01C 21/34* (2006.01)
*G05D 1/02* (2020.01)
(Continued)

(52) U.S. Cl.
CPC ....... *G01C 21/3438* (2013.01); *G01C 21/343* (2013.01); *G01C 21/3484* (2013.01);
(Continued)

(58) Field of Classification Search
CPC ............. G01C 21/3438; G01C 21/343; G01C 21/3484; G01C 21/3492; G01C 21/3676;
(Continued)

(56) References Cited

U.S. PATENT DOCUMENTS 8,855,913 B2  10/2014 Certin
9,304,009 B2  4/2016 Beaurepaire et al.
(Continued)

FOREIGN PATENT DOCUMENTS

CN  105528903 A  4/2016
CN  107380093 A  11/2017
(Continued)

OTHER PUBLICATIONS

International Search Report and Written Opinion for Application No. PCT/US2020/027210 dated Jul. 15, 2020.
(Continued)

*Primary Examiner* — Jess Whittington
*Assistant Examiner* — Brian E Yang
(74) *Attorney, Agent, or Firm* — Botos Churchill IP Law

(57) ABSTRACT

Aspects of the disclosure provide for advanced trip planning for an autonomous vehicle service. For instance, an example method may include determining a potential pickup location for a user, determining a set of potential destination locations for a user, and determining a set of potential trips. For each potential trip a vehicle of a fleet of autonomous vehicles of the service may be assigned and trip information, including an estimated time of arrival for the assigned vehicle of the potential trip to reach the destination location of the potential trip, may be determined. The trip information for each potential trip may be provided for display to the user. Thereafter, confirmation information identifying one of the set of potential trips may be received, and the assigned
(Continued)

vehicle for one first of the set of potential trips may be dispatched to pick up the user.

20 Claims, 7 Drawing Sheets

(51) Int. Cl.
*G05D 1/00* (2006.01)
*G06Q 50/30* (2012.01)

(52) U.S. Cl.
CPC ....... *G01C 21/3492* (2013.01); *G05D 1/0027* (2013.01); *G05D 1/0272* (2013.01); *G05D 1/0293* (2013.01); *G06Q 50/30* (2013.01)

(58) Field of Classification Search
CPC .. G05D 1/0027; G05D 1/0272; G05D 1/0293; G06Q 50/30; G06Q 30/0629; G06Q 10/0631; G06Q 30/0635; G06Q 30/0639; G06Q 30/0643
See application file for complete search history.

(56) References Cited

U.S. PATENT DOCUMENTS

| | | | |
|---|---|---|---|
| 9,911,084 B2 | 3/2018 | Bryson et al. | |
| 2012/0259541 A1 | 10/2012 | Downey et al. | |
| 2014/0278070 A1 | 9/2014 | McGavran et al. | |
| 2015/0339928 A1 | 11/2015 | Ramanujam | |
| 2017/0193627 A1 | 7/2017 | Urmson et al. | |
| 2017/0316533 A1 | 11/2017 | Goldman-Shenhar et al. | |
| 2018/0059687 A1 | 3/2018 | Hayes et al. | |
| 2018/0299277 A1 | 10/2018 | Iland et al. | |
| 2018/0321688 A1 | 11/2018 | Chase | |
| 2020/0050198 A1 | 2/2020 | Donnelly | |
| 2020/0124426 A1 | 4/2020 | Beaurepaire et al. | |

FOREIGN PATENT DOCUMENTS

| | | |
|---|---|---|
| CN | 108474665 A | 8/2018 |
| JP | 2016091411 A | 5/2016 |
| WO | 2017117095 A1 | 7/2017 |
| WO | 2019018695 A1 | 1/2019 |

OTHER PUBLICATIONS

The Extended European Search Report for European Patent Application No. 20787556.8, dated Nov. 15, 2022, 10 ages.

Yuan , et al., "Where to Find My Next Passenger?", UbiComp, 2011, 10 Pages.

Chinese Office Action for Application No. CN202010277946.8 dated Sep. 28, 2023, 21 Pages.

ADVANCED TRIP PLANNING FOR AUTONOMOUS VEHICLE SERVICES

CROSS REFERENCE TO RELATED APPLICATIONS

The present application is a continuation of U.S. patent application Ser. No. 16/379,934, filed Apr. 10, 2019, the entire disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services.

Other systems which provide transportation services typically include drivers or conductors who are tasked with making decisions about how to operate vehicles. Such services may include some backend server systems which can dispatch vehicles to certain locations to provide transportation services as well as provide fleet management and vehicle staging instructions.

BRIEF SUMMARY

One aspect of the disclosure provides a method of advanced trip planning for an autonomous vehicle service. The method includes determining, by one or more processors of one or more server computing devices, a potential pickup location for a user; determining, by the one or more processors, a set of potential destination locations for a user; determining, by the one or more processors, a set of potential trips from the potential pickup location to each of the set of potential destination locations; for each potential trip of the set of potential trips assigning, by the one or more processors, a vehicle of a fleet of autonomous vehicles of the autonomous vehicle service and determining, by the one or more processors, trip information including an estimated time of arrival for the assigned vehicle of the potential trip to reach the destination location of the potential trip; providing, by the one or more processors, the trip information for each potential trip to a client computing device for display to the user; and sending, by the one or more processors, instructions to the assigned vehicle for one of the set of potential trips in order to cause the assigned vehicle for the one of the set of potential trips to maneuver to the potential pickup location of the one of the set of potential trips.

In one example, determining the potential pickup location is based on a routing for vehicles of the fleet. In another example, determining the potential pickup location is based on routing for vehicles of the fleet. In another example, determining the set of potential trips is based on a time of day for the set of potential trips as well as the potential pickup location. In another example, determining the set of potential trips includes inputting data identifying historical trip information into a model that outputs the set of potential trips. In this example, the historical trip information is in vector form. In addition or alternatively, the model further outputs a score for each potential trip of the set of potential trips, and the method further comprises ranking each potential trip of the set of potential trips, and the rankings are provided to the client computing device with the trip information such that the set of potential trips are displayed to the user according to the rankings. In another example, the method also includes, after providing the trip information, receiving, by the one or more processors from the client computing device, confirmation information identifying a selected trip, wherein the selected trip comprises the one of the set of potential trips and the instructions are sent after the confirmation information is received. In another example, the method also includes, after providing the trip information, receiving, by the one or more processors from the client computing device, confirmation information identifying a selected trip, wherein the instructions are sent before the confirmation is received. In another example, after providing the trip information, receiving, by the one or more processors from the client computing device, confirmation information identifying a selected trip, and determining the user score based on a historical user score for the user and a current user score for the user. In this example, the historical user score represents a past value for the user to the service, the current user score represents a current value for the user to the service, and the instructions are sent before or after the confirmation is received depending upon a user score for the user. In addition, the method also includes determining the historical user score based on a plurality of factors including one or more of a number of trips the user has taken, a number of reviews or other posts about the service, whether the user has incurred any costs to the service, how the user has interacted with an application of the service on the client computing device, or whether the user was on time for past pickups. In addition or alternatively, the method also includes determining the current user score based on a plurality of factors including one or more of a cost of a ride, current availability of vehicles of the fleet of autonomous vehicles, current demand for vehicles, whether there are other users with high historical user scores nearby that are also likely to request trips, or estimated times of arrival for a vehicle to reach a pickup location. In addition or alternatively, the method also includes comparing the user score to a threshold value, and wherein the instructions are sent before or after the confirmation is received based on the comparing. In another example, the trip information also includes an estimated time of arrival for an assigned vehicle to reach a potential pickup location. In another example, the trip information also includes a cost of a potential trip to the user. In another example, the trip information also includes an estimated time of arrival for the assigned vehicle of the potential trip to reach the potential pickup location. In another example, the set of potential trips are determined in response to receiving a notification from the client computing device indicating that an application of the service has been opened. In another example, the method also includes, receiving a notification that an application of the service has been closed within a predetermined period of time of the confirmation information being sent from the client computing device and sending a request to enable a customer service representative to contact the user to confirm that the user intended to confirm the trip. In another example, the method also includes, receiving a notification that an application of the service has been closed within a predetermined period of time of the confirmation information being sent from the client computing device, and sending instructions to the assigned vehicle of the one of the set of potential trips in order to cancel a trip. In another example, the method also includes, ranking the set of potential trips based on a plurality of factors, and wherein the ranking is provided with the trip information in order to enable the set of potential trips to be displayed in accordance with the ranking.

DETAILED DESCRIPTION

Overview

Figure 1:
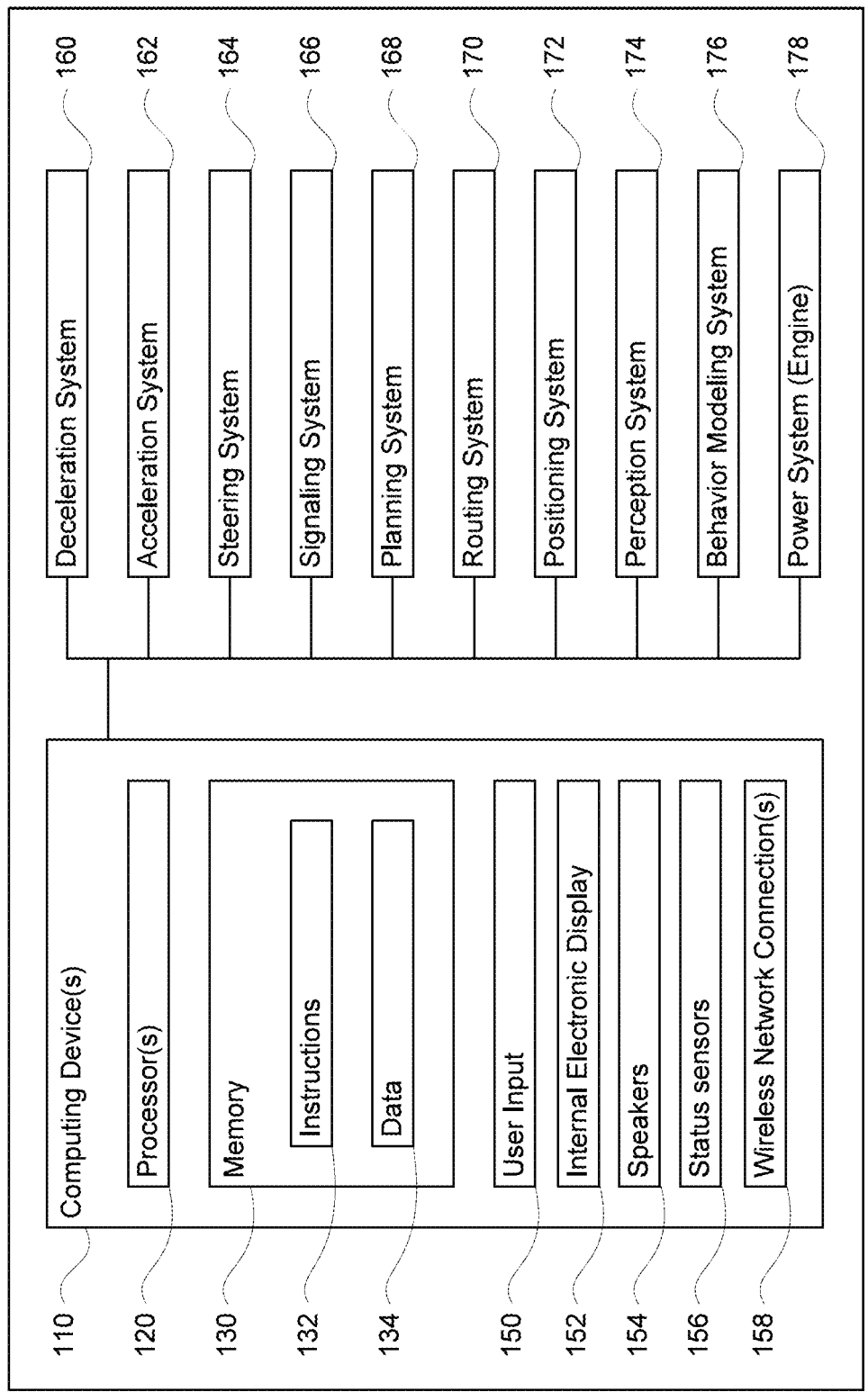
FIG. 1 is a functional diagram of an example vehicle in accordance with an exemplary embodiment.

The technology relates to advanced trip planning for an autonomous vehicle service including a fleet of autonomous vehicles. For instance, a dispatching system may automatically identify potential trips that a user of the service might want to take now or at some time in the future. Each of these potential trips may include both a pickup location and a destination location. With this information as well as information about the availability of the fleet of autonomous vehicles, the dispatching system may pre-assign an autonomous vehicle to the potential trip. This may enable the dispatching system to provide the user with suggested trips. In addition, the dispatching system may be able to make certain decisions, for instance to position (or pre-position) in order to reduce "empty miles" (where a vehicle drives around without passengers and/or cargo) and/or to position (or pre-position) vehicles for other benefits (for instance, such as to enable early arrival times, favoring high value customers, maintenance, etc.). In this regard, the features described herein may be used to increase ridership, reduce estimated (and possibly actual) times of arrival for pickups, reduce "empty miles", and increase demand for trips.

In order to facilitate advanced trip planning, the dispatching system may include a storage system configured to store various information including historical user scores. The historical user scores may allow the service to differentiate between high value users and potential bad actors. The historical user scores may be determined, for instance, based on a plurality values representative of multiple factors relating to how a user interacts with the service, vehicles of the fleet, the public, and customer service representatives of the service. More active users may be more likely to have higher historical user scores.

In some examples, the dispatching system may include one or more server computing devices configured to identify potential rides. These determinations may be made in response to receiving a notification from a user's client computing device indicating that an application for the service has been opened on the user's client computing device. In order to identify potential rides, the server computing devices may be configured to determine a potential pickup location for a user, for instance, using a plurality of heuristics. The server computing devices may also determine a set of potential destination locations for a user using a plurality of heuristics. Alternatively, potential pickup and/or destination locations may be identified using a machine learning model. The model may be trained on the historical trip information for a plurality of users as well as each additional trip taken by the user.

The server computing devices may then determine a set of potential trips using the potential pickup location and each destination location of the set of potential destination locations. For each potential trip, the server computing devices may assign a vehicle based on currently available vehicles or vehicles that are expected to be available. Once a vehicle is assigned, the server computing devices may also determine other information about the trip, such as an estimated time of arrival ("ETA") at the pickup location for the vehicle, an ETA at the destination location for the vehicle, as well as a cost of the trip which the user will be charged.

The set of potential trips may then be sent to the user's client computing device for display to the user. This may also include sending the pickup and destination locations, ETAs, costs, as well as corresponding map information. Once the potential trips are displayed, the application may enable the user to confirm the trip. The confirmation may cause the application to send a notification to the server computing devices confirming the trip. In response, the server computing devices may send instructions to the assigned vehicle to maneuver to the pickup location of the confirmed trip, pick up a passenger, and proceed to the destination location of the confirmed trip.

In some instances, prior to the user confirming any of the set of potential trips, the server computing devices may automatically send instructions to an assigned vehicle to travel to the pickup location of one of the set of potential trips to pick up the user. This may be done, for instance, in response to a determination that an overall user score for the one of the set of potential trips meets a threshold value. The overall user score may be determined based on a historical user score as well as a current context user score. Alternatively, rather than waiting for the user to confirm the trip, the server computing devices could automatically arrange one of the potential trips (i.e. a highest ranked potential trip) by assigning and dispatching a vehicle to the potential pickup location for that one.

The features described herein may enable advanced trip planning for an autonomous vehicle service. Because the dispatching system may pre-assign an autonomous vehicle to the potential trip, this may enable the dispatching system to proactively suggest and enable trips without requiring users to actually initiate anything as well as to increase ridership, reduce estimated (and possibly actual) times of arrival for pickups and/or destinations (for drop offs), reduce "empty miles", increase demand for trips, and possibly reduce costs charged to users.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user inputs 150 (e.g., a mouse, keyboard, touch screen, buttons, and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing devices 110 to provide information to passengers within the vehicle 100. The computing devices 110 may also include and/or receive feedback from various status sensors 156 of the vehicle which may include, for instance, a door sensor that may indicate to the computing devices 110 the status (i.e. whether open or closed) of a vehicle door (such as vehicle doors 350, 352 of FIG. 2).

Other sensors, such as seat belt sensors, seat sensors (e.g. pressure sensors or switches), internal cameras, etc. may also be part of and/or provide feedback to the computing devices 110 about the status of the vehicle 100.

Computing devices 110 may also include one or more wireless network connections 158 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 132 of memory 130. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route generated by a routing system 170 to a location. For instance, the routing system 170 may use map information to determine a route from a current location of the vehicle to a destination location. The planning system 168 may periodically generate trajectories, or short-term plans for controlling the vehicle for some period of time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. The map information need not be entirely image based (for example, raster). For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 2:
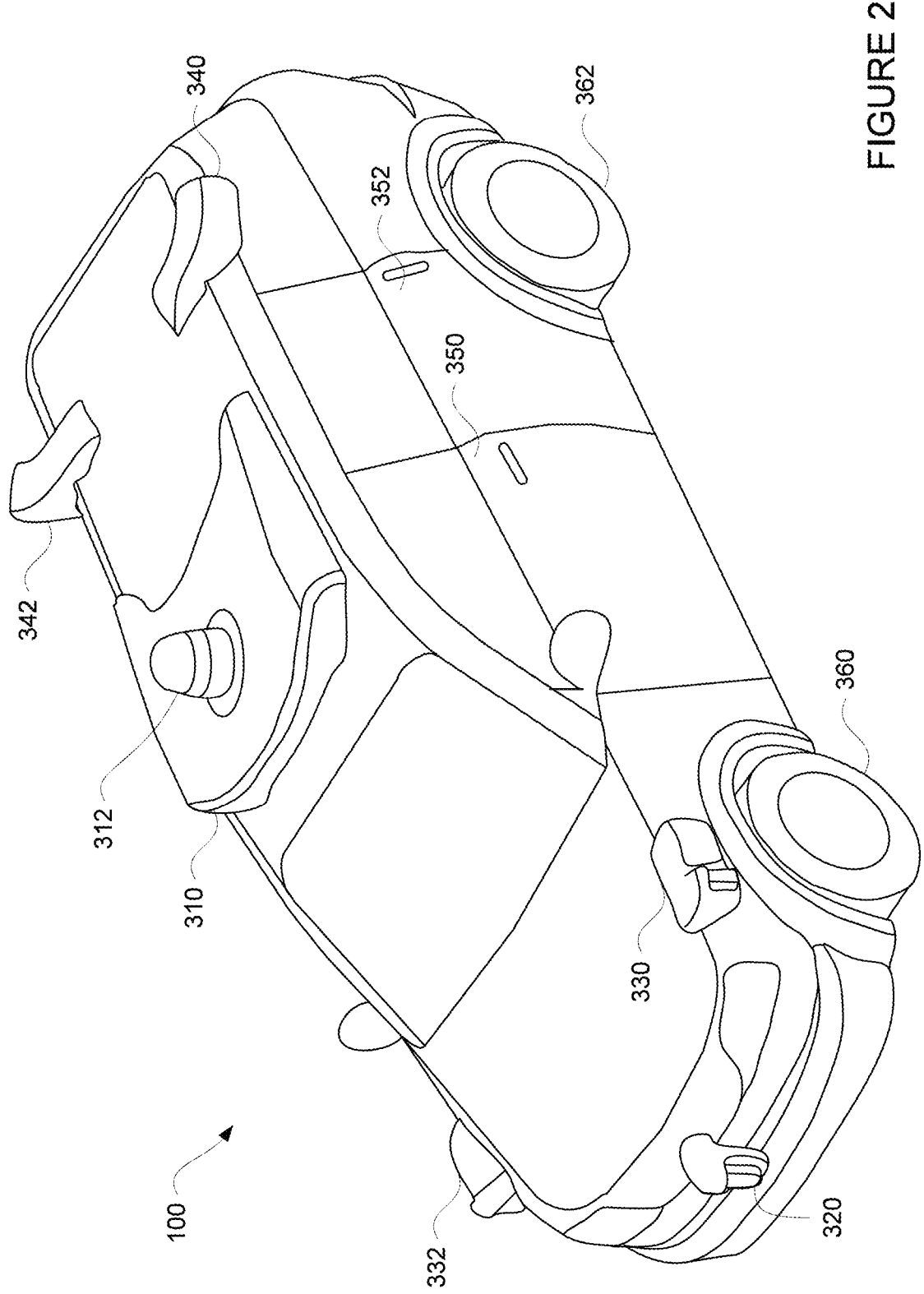
FIG. 2 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 3:
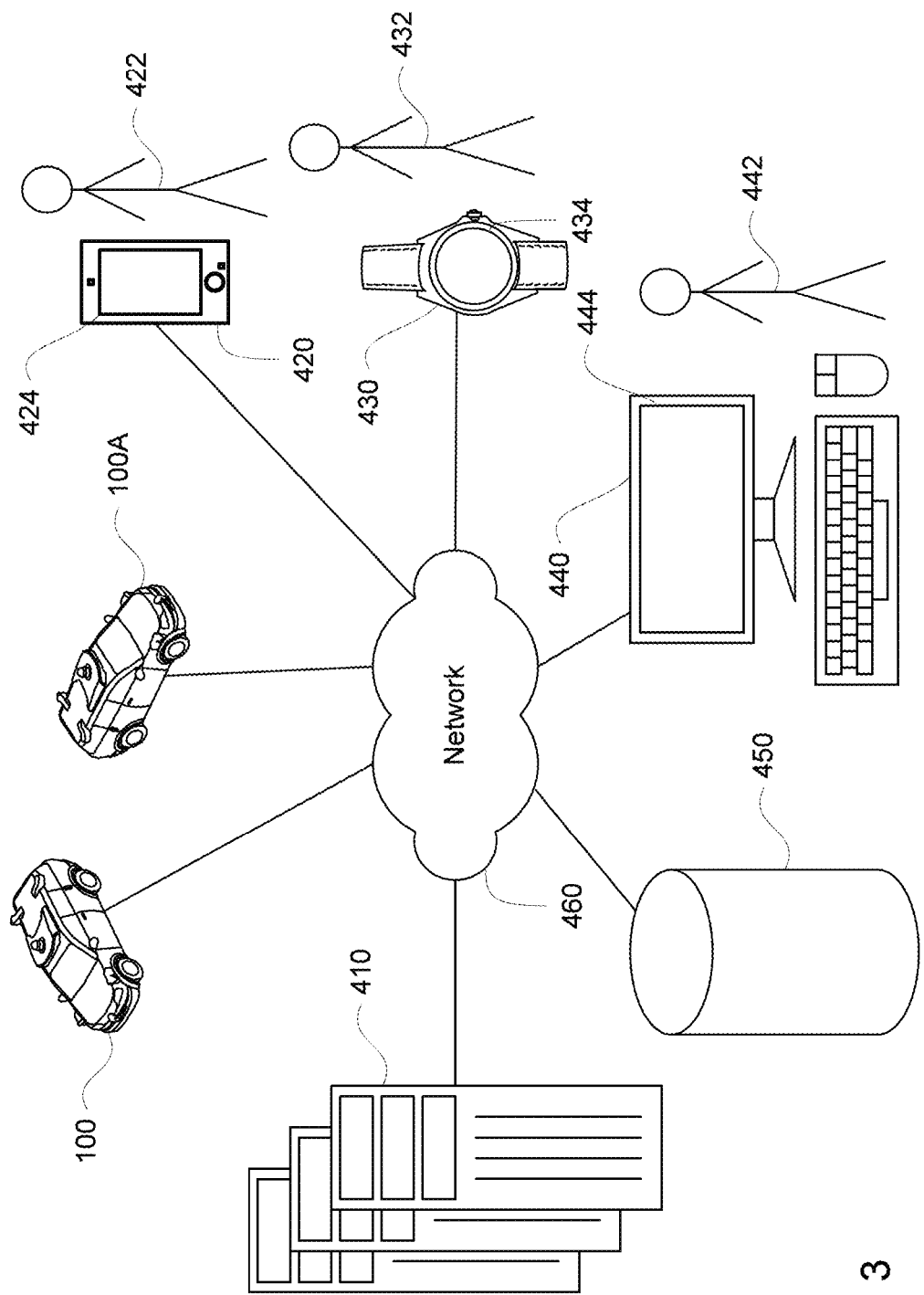
FIG. 3 is a pictorial diagram of an example system in accordance with aspects of the disclosure.
Figure 4:
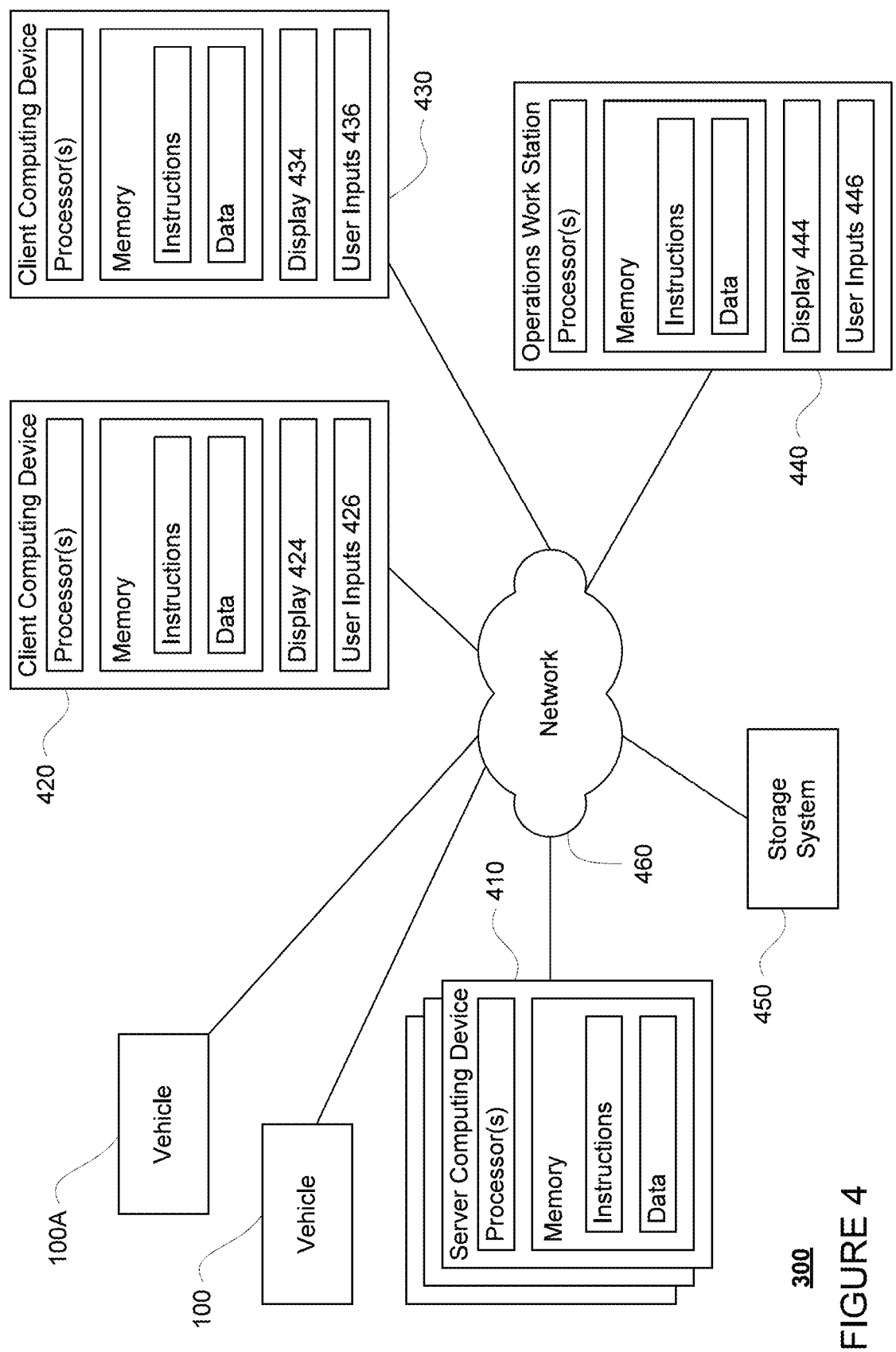
FIG. 4 is a functional diagram of the system of FIG. 3 in accordance with aspects of the disclosure.

Computing device 110 of vehicle 100 may also receive or transfer information to and from other computing devices, such as those computing devices that are a part of the autonomous vehicle service as well as other computing devices. FIGS. 3 and 4 are pictorial and functional diagrams, respectively, of an example system 300 that includes a plurality of computing devices 410, 420, 430, 440 and a storage system 450 connected via a network 460. System 300 also includes vehicle 100 and vehicles 100A, which may be configured the same as or similarly to vehicle 100. Although only a few vehicles and computing devices are depicted for simplicity, a typical system may include significantly more.

As shown in FIG. 3, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles of the autonomous vehicle service that can be dispatched by server computing devices 410 to various locations. In this regard, the server computing devices 410 may function (in conjunction with storage system 450) as a dispatching system for the autonomous vehicle service which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example, the user may input information using a small keyboard, a keypad, microphone, using visual signals with a camera, or a touch screen.

In some examples, client computing device 440 may be customer service work station used by an administrator or customer service representative to provide concierge or remote assistance services to users such as users 422 and 432. For example, a representative 442 may use the customer service workstation 440 to communicate via a telephone call or audio connection with users through their respective client computing devices or vehicles 100 or 100A in order to ensure the safe operation of vehicles 100 and 100A and the safety of the users as described in further detail below. Although only a single customer service workstation 440 is shown in FIGS. 3 and 4, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

The storage system 450 may be configured to store various information. This information may include the status (serving a trip, passengers, etc.), current locations, and expected future locations of the vehicles of the fleet. The information may also include user information for users of an application of the service. In this regard, passengers who ride in the vehicles may be considered a subset of all users of the service. The user information may include historical trip information about previous trips (dates, times, pickup and destination locations, etc.) taken by users, locations designated as "favorite" pickup and/or destination locations by users, as well as historical user scores. In some instances, the historical trip information for each user may be arranged as a vector identifying certain details of a user's trip history such as the details of his or her home address, work address, location history, pickup locations and destination locations for certain trips, etc.

The historical user scores may allow the service to differentiate certain useful user traits, such as high value users and potential bad actors. The historical user scores may be determined, for instance, based on a plurality of values representative of multiple factors relating to how a user interacts with the service, vehicles of the fleet, the public, and customer service representatives of the service. These factors may include, for instance, the number of trips the user has taken, the number of reviews or other posts about the service, extent to which the user has incurred maintenance costs to the service (e.g., damage to a vehicle, soiling or hard use of a vehicle requiring additional cleaning, etc.), extent to which the user was on time for past pickups, whether the user has had any payment issues (e.g. credit card declined, missing payment information, etc.), etc. The values representative of the multiple factors may be summed together as a scalar value or alternatively can be mathematically represented as arrays of numbers that output by some machine learning or heuristic models. As an example, a vector [n0, n1, n2 . . . nk] may represent a historical user score for a user. These historical user scores may be used to offer perks, coupons, or subsidized trips to users More active users may be more likely to have higher historical user scores. For instance, a user who take more trips, provide constructive feedback or promotes the service, has a consistent pattern of taking trips, has a high overall number of trips or costs paid for trips relative to other users, timeliness in reaching and boarding vehicles (for pickup), have lower times between opening the application and requesting a trip, etc. may have a higher historical user score and/or may be considered a high value user. In some instances, how a user interacts with an application of the service may also influence a user's historical user score. For example, if the user immediately confirms a ride (as described below), this may be used to increase the user's historical user score as the user may be more likely to want to take a trip. As another example, if a user requests a trip, subsequently cancels, and then requests the same trip again (such that the cancellation was presumably a mistake), or consistently provides unjustifiably low scoring reviews of the service, this may not impact a historical user score for that user or may impact the historical user score for that user negatively. As another example, customer service representatives may increase, or in some cases, decrease historical user scores based on interactions with users.

The following is an example calculation for a historical user score which may be used by the server computing devices 410 in order to determine a historical user score:

$$(num\_trips\_with\_in\_ride\_feedback/avg\\(num\_trips\_with\_in\_ride\_feedback\_by\_cohort\_members))+(meters\_to\_dropoff/total\_meters\\travelled-meters\_to\_pickup/total\_meters\_travelled)+(avg(boarding\_time)/total\_wait\_time)+\\(num\_trips/avg(num\_trips\_by\_cohort\_members))$$

In this example, num_trips_with_in_ride_feedback may represent a number of trips a user has taken and provided feedback during that trip (i.e., in-ride feedback), and num_trips_with_in_ride_feedback_by_cohort_members may represent a total number of trips that all users or similarly situated users of the service have taken and provided feedback during those trips. Total meters traveled may represent the total number of meters traveled by the user while taking trips with the service. Meters_to_pickup may represent how far on average that vehicles have had to drive in order to pickup a passenger once the vehicles are dispatched to pick up the passenger, meters_to_dropoff may represent how far on average that the vehicles have had to drive in order to reach the passenger's destination(s) once the vehicles are dispatched to pick up the user (i.e. the total distance driven from the point when the vehicle is dispatched to the point when the passenger is dropped off). In addition, boarding_time may refer to how long on average that the passenger took to enter the vehicle and start a trip once the passenger reaches the vehicle, and total_wait_time may refer to the time on average that the vehicle was waiting for the passenger to reach the vehicle. The value num_trips may represent a total number of trips taken by the user and avg(num_trips_by_cohort_members) may represent the average number of trips for all users or similarly situated users of the service. Once determined and/or as updated, these historical trip scores may be stored in the storage system 450 for quick access and retrieval by the server computing devices 410.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 110, and in response, receive the application. The application may be installed locally at the client computing device.

Figure 5:
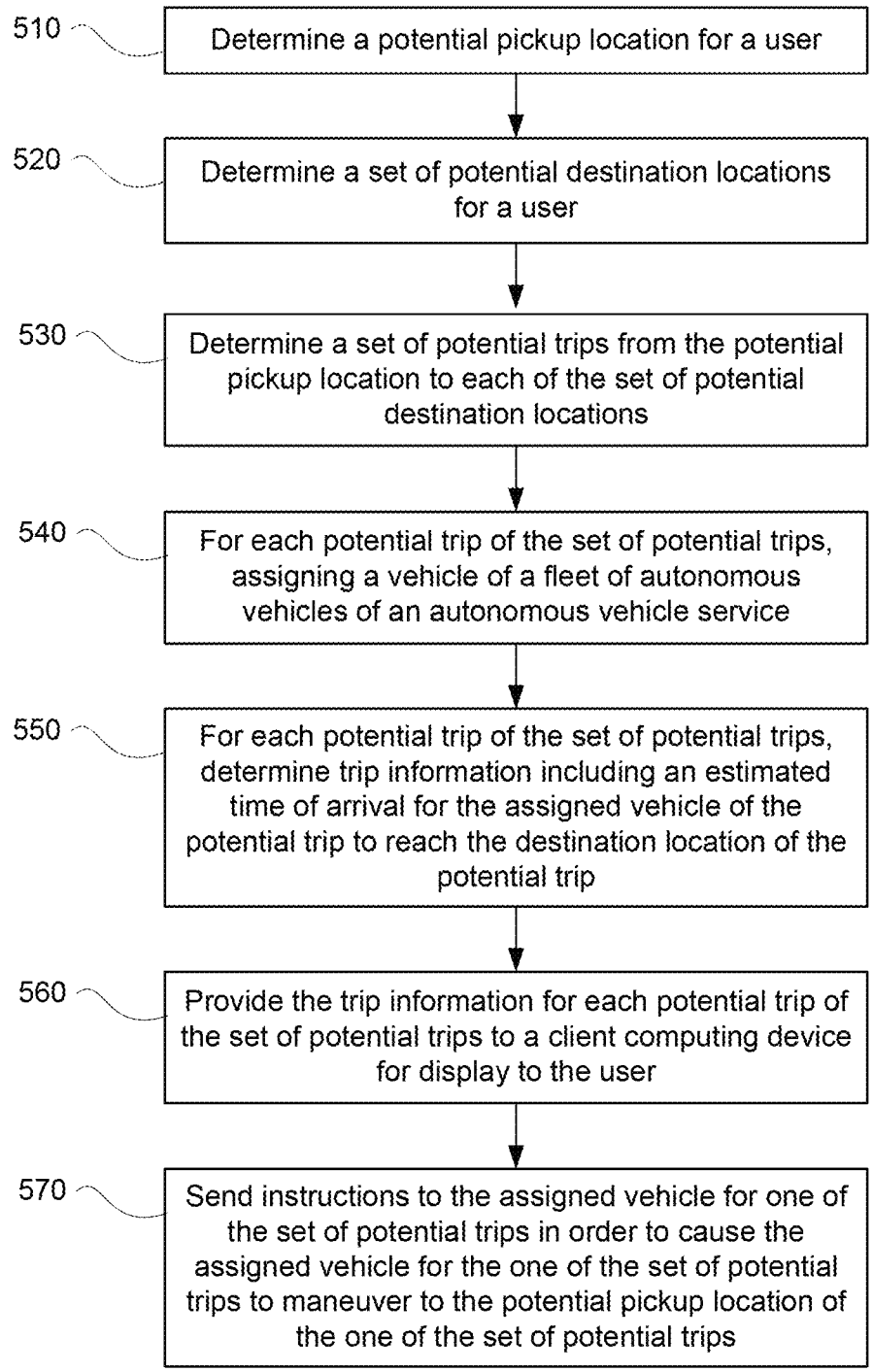
FIG. 5 is an example flow diagram in accordance with aspects of the disclosure.

In some examples, as noted above, the server computing devices 410 of the dispatching system may be configured to identify potential rides. These determinations may be made in response to receiving a notification from a user's client computing device indicating that the locally installed application has been opened on the user's client computing device. FIG. 5 is an example flow diagram 500 of aspects of the technology described herein for advanced trip planning for an autonomous vehicle service, which may be performed by one or more processors of one or more server computing devices of an autonomous vehicle service, such as processors 420 of server computing devices 410.

Turning to block 510, in order to identify potential rides, the server computing devices 410 may be configured to determine a potential pickup location for a user. For instance, the server computing devices 410 may determine a potential pickup location using a plurality of heuristics. For example, a pickup location may correspond to a current or last received location (for instance, GPS location) of the user's client computing device (mobile phone). In addition or alternatively, a potential pickup location may be an expected future location of the user's client computing device. For example, if the user's historical trip data indicates that the user uses the service for trips to go home (e.g., from work) on a particular day of the week at a particular time (Mondays, Wednesdays, and Fridays at 5:30 pm), the work location may be a potential pickup location. As another instance, if the server computing devices have access to the user's calendar information, appointment locations may be used to identify potential pickup locations. In some instances, the potential pickup location may be determined based on a user preference or ease of access for a vehicle for a particular side of a street.

As shown in block 520, the server computing devices may also determine a set of potential destination locations for a user. For instance, the set of potential destination locations may be determined using a plurality of heuristics. In one example, the set of potential destination locations may simply be the last 3 destination locations for the user according to the user's historical trip information given the potential pickup location for the user. In addition or alternatively, the set of potential destination locations may be identified based on both the potential pickup location for the user as well as a time of day or day of the week. For example, a user's historical trip information may indicate that the user typically takes trip from home to work Mondays, Wednesdays, and Fridays at 8:30 am. As such, if it is close to 8:30 am on a Monday, the work location may be identified as a potential destination location. As another instance, if the server computing devices have access to the user's calendar information, appointment locations may be used to identify potential destination locations.

In addition, a potential pickup and/or set of potential destination location may be determined based on other factors. For instance, the potential pickup and/or destination locations can be identified or adjusted (i.e. moved) based on routes (e.g. what particular set of direction or turns the vehicle would follow to reach the location) that would be most efficient or most preferable for the user and/or vehicles of the fleet (for instance, in terms of optimizing fuel efficiency, avoiding certain maneuvers such as unprotected turns or other difficult autonomous driving tasks, etc.). This may allow the dispatching system to be more particular about which trips are suggested which may not be possible when human drivers (who may take more varied routes) are involved. In addition by selecting potential pickup and/or set of potential destination location, the dispatching system may also end up able to position (or pre-position for future trips) in order to reduce "empty miles" (where a vehicle drives around without passengers and/or cargo) and/or position (or pre-position for future trips) vehicles for other benefits (for instance, such as to enable early arrival times, favoring high value customers, maintenance, etc.). In addition, a potential pickup and/or set of potential destination location may be determined based on other heuristics including, for instance, safety, density of environment, trips with best user feedback and/or ratings, etc.

Alternatively, potential pickup and/or destination locations may be identified using a machine learning model. The model may be trained on the historical trip information for a plurality of users as well as each additional trip taken by the user. For instance, the historical trip information (e.g., the vectors described above) may be used as training inputs, and the additional trips taken may be used as training outputs. The model may be trained such that for any input of historical trip information for a user, the model may output a set of potential pickup and/or destination locations as well as a ranked order or other value representing a score or likelihood that a (e.g. any) user will take a trip using the set of potential pickup and/or destination locations. This ranked order may be used to display the trips to a user as discussed below. In some instances, a set of potential pickup locations (e.g., at least the last received or current location of the user's client computing device) may also be used as inputs in order to have the model identify a set of potential destination locations. In some instances, the model may be trained to take into account other sources of information for a user such as web searches. For instance, if a user searches for a particular product using his or her client computing device, the location of a nearby brick and mortar store with the product available or likely to sell the same or a similar product, may be identified as a potential destination location. Other signals, such as the time between when a user opens an application and requests a ride, may also be used to train the mode. For instance, as noted above, the shorter the time for a user, the more likely that user may be to request a future trip. Over time, the parameters of the model may be refined to increase the usefulness of the scores.

The model thus may be able to extract patterns of trip behaviors. For instance, the model may eventually recognize certain behaviors of individual users (e.g., User A always takes trips around 8 am on Sunday to a supermarket) as well as behaviors of groups of users (e.g., users typically move from suburban areas to dense urban areas around 8 am on weekdays and from dense urban areas to suburban areas around 5 pm on weekdays, etc.).

In some instances, the model may also detect anomalies, such as when a user who typically takes a trip at 8:30 am on Mondays from home to work is located in a different state or country, such as when the user is on vacation. For such anomalies, a second set of heuristics or a second model for vacationing users or anomalies may be used to determine potential destination locations in such instances. For instance, different potential destination locations may be identified, for instance, based on points of interest that are nearby the user's current location, rather than simply using the user's work location as a potential destination location.

As shown in block 530, a set of potential trips are determined using the potential pickup location and each destination location of the set of potential destination locations. For instance, if there are three destination locations in the set of potential destination locations, the server computing devices 410 may determine 3 potential trips.

As shown in block 540, for each potential trip, a vehicle of a fleet of autonomous vehicles of the autonomous vehicle service are assigned. For instance, the server computing devices 410 may assign a vehicle based on currently available vehicles or vehicles that are expected to be available (for instance, if the trip is expected to occur sometime in the future, the trip may be entered into a future trip queue in order to identify certain assigned vehicles as unavailable at different times in the future). Vehicles may be assigned, for instance, based on distance to the pickup location for a potential trip, vehicle availability, service areas (e.g., can this vehicle travel to the pickup and/or designation location for the trip), locations of vehicles, preferences of the user (e.g., preference for autonomous vehicles with or without drivers, of a preferred make or model, having special features and capabilities (e.g., accessibility accommodations, WiFi, entertainment options, interior design), etc.), impact on the next trip for the vehicle (e.g. by finishing on trip, facing the correct direction, the vehicle can be optimized for a subsequent trip), and other typical considerations. In some instances, if vehicles are assigned based on the impact of the next trip, this may allow the service to lower costs to users as vehicles may be positioned to drop off passenger at locations that may be convenient for picking up the next passenger.

As shown in block 550, for each potential trip of the set of potential trips, trip information is determined. This trip information includes an estimated time of arrival for the assigned vehicle of the potential trip to reach the destination location of the potential trip. For instance, once a vehicle is assigned, the server computing devices 410 may also determine other information about the trip, such as an ETA at the pickup location for the vehicle, an ETA at the destination location for the vehicle (once the assigned vehicle has picked up the user), as well as a cost of the trip which the user will be charged (for instance, determined based on the ETAs, etc.).

In some instances, the server computing devices 410 may be able to determine a "rough" ETA and estimated cost for a trip without actually assigning a vehicle. For instance, a statistical model could be applied by taking into account the statuses (i.e. available or not available) from all vehicles of the fleet in the vicinity of the possible pickup location and other historical/predictive models to determine a rough ETA. This may provide some additional benefits to the system by increasing the speed at which information can be provided to a user. However, in such cases, the system may only be able to provide an estimate with probabilistic assignments, for example, there may be only a 95% that the service will actually be able to provide a "rough" ETA to a particular pickup and/or destination location within a given time window.

Figure 6:
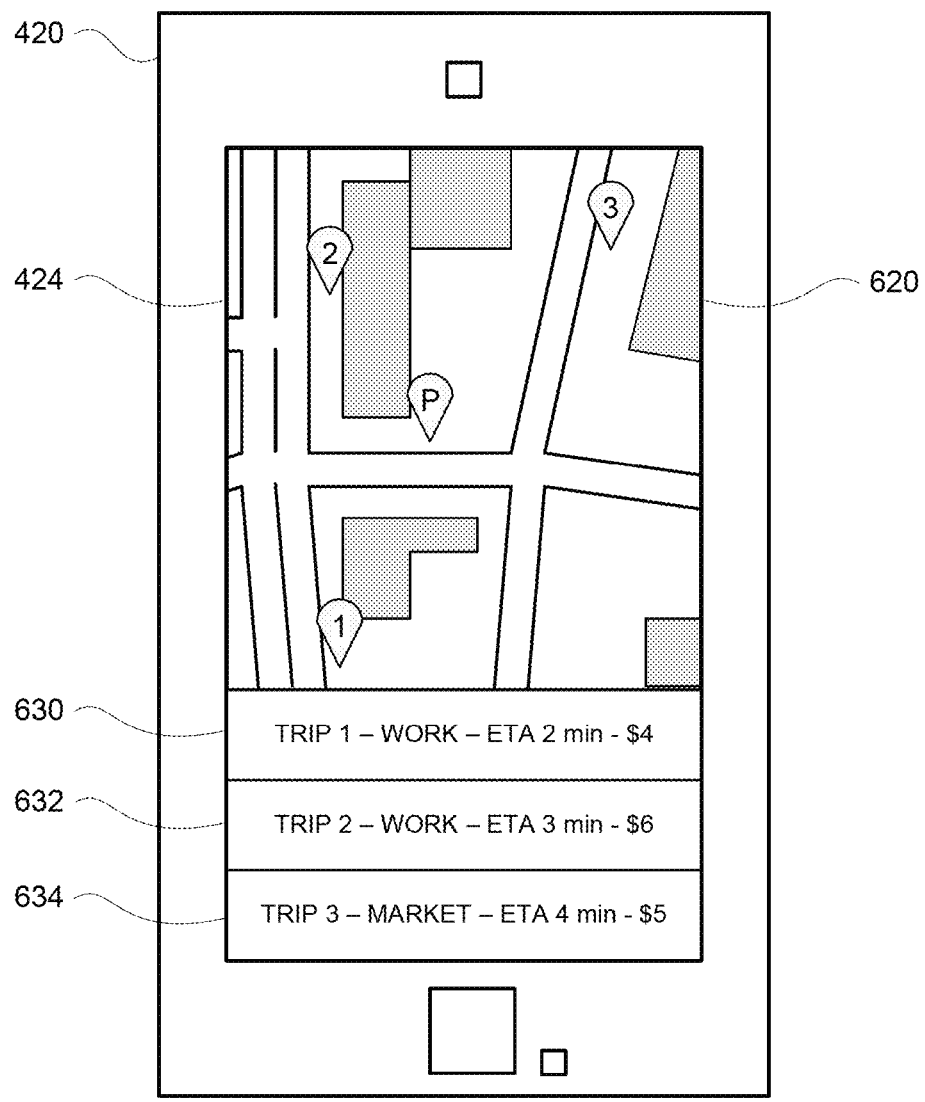
FIG. 6 is an example client computing device and display in accordance with aspects of the disclosure.

As shown in block 560, the trip information for each potential trip to is provided to a client computing device for display to the user. For instance, the set of potential trips may be sent by the server computing devices 410 to the user's client computing device for display to the user. The sent information may also include sending the pickup and destination locations, ETAs, costs, as well as corresponding map information. The potential trips may then be displayed as a list with or without a map. In one example, the display may identify the destination location, an ETA to reach the destination location, as well as a cost to be charged to the user for the potential trip. For instance, FIG. 6 is an example of client computing device 420 including the display 424 which includes a map 620 as well as a set of potential trips 630, 632, 634. The map 620 may correspond to an area that is broad enough to identify the pickup location (P) and destination locations (1, 2, and 3 corresponding to TRIPS 1, 2, and 3, respectively) for each potential pickup location. As shown, each potential trip is represented as a horizontal bar arranged across the display including a destination location, an ETA to reach the destination location, and a cost to be charged to the user for the potential trip though other configurations may also be possible.

In some instances, trips may be ranked and displayed according to those having the shortest ETA, those that are easiest for the vehicles of the fleet to reach (e.g., no complicated maneuvers, avoids certain areas, good traffic conditions, reachable given current or expected weather conditions and vehicle capabilities, etc.), those that the user has designated as "favorites", the most recent trips, the aforementioned scores, etc. The top 2 or 3 trips may then be provided by the server computing devices 410 to the user's client computing device and displayed in the ranked order. Alternatively, the order of these potential trips, TRIP 1, TRIP 2, TRIP 3 may correspond to the ranked order provided by the model or by ordering according to an overall user score for each of the potential trips as discussed further below.

In response, at block 570, instructions are sent to the assigned vehicle for one of the set of potential trips in order to cause the assigned vehicle for the one of the set of potential trips to maneuver to the potential pickup location of the one of the set of potential trips. For instance, the server computing devices 410 may dispatch the assigned vehicle for that trip by sending instructions to the assigned vehicle in order to cause that vehicle to maneuver itself, for instance in an autonomous driving mode as discussed above, to the pickup location of the confirmed trip, pick up a passenger, and proceed to the destination location of the confirmed trip.

In some instances, once the potential trips are displayed, the application may enable the user to confirm the trip with a confirmation gesture. As an example, the gesture may include a swipe right or left or a tap on the user's client computing device. For instance, in the case where the display 424 includes a touch-sensitive input, a user may swipe and/or tap on one of the bars (i.e. potential trips 630, 632, 634) in order to confirm one of the potential trips. In response to the gesture, the application may automatically send a notification from the client computing device to the server computing devices 410 confirming the trip. In this regard, after providing the trip information, confirmation information identifying a first of the set of potential trips is received from the client computing device.

In addition, the application may also enable the user to use a different gesture to request more details for one of the displayed potential trips. For instance, if the confirmation gesture is a swipe, a tap may be a request for more details.

As an alternative, if the confirmation gesture is a tap, a swipe left or right may be a request for more details. As another alternative, if the confirmation gesture is a swipe right, a left may be a request for more details or the reverse may be true. After requesting more details, the details of one or more of the potential trips may be displayed so that the user is able to review all of the information before confirming one of the potential trips.

Figure 7:
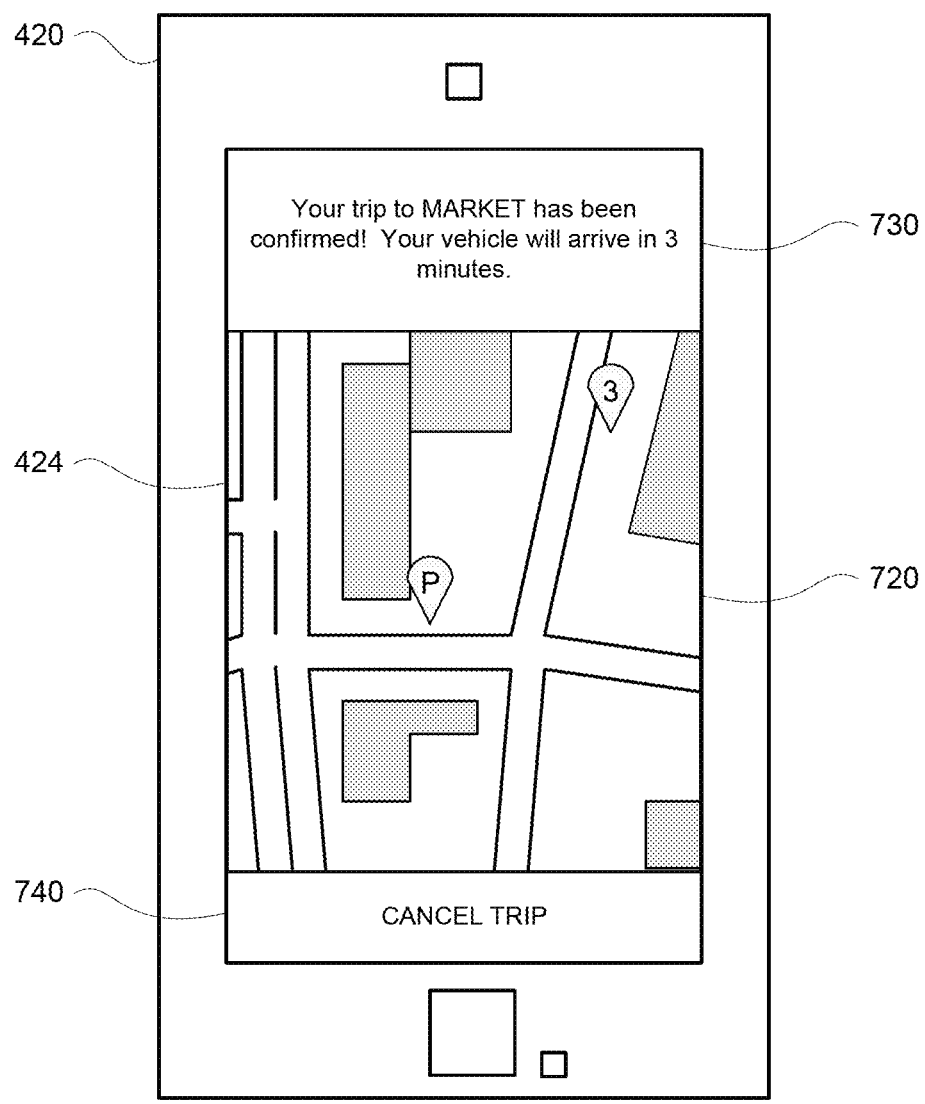
FIG. 7 is another example client computing device and display in accordance with aspects of the disclosure.

In certain circumstances, a user may accidentally confirm a trip for any number of reasons. To address this, after sending the confirmation the application may provide the user with a "grace period" of a few seconds or more or less to cancel the trip, for instance, by displaying a cancel option in the application. For instance, FIG. 7 shows that the display 424 includes confirmed trip details 720 including an ETA for the vehicle as well as a map 730. Although not shown, the current location of the assigned vehicle may also be displayed. In addition, FIG. 7 depicts a cancel option 740 as a button which may be tapped or swiped in order to send a request by the client computing device 420 to the server computing devices 410 in order to cancel the trip. In some instances, the user may not even realize that he or she has confirmed a trip. In that regard, if the user confirms a trip and within a short period of time, such as a few seconds or more or less, closes the application, the application may send a notification from the client computing devices 420 to the server computing devices 410 indicating the same. The server computing devices 420 may then send a request to enable a customer service representative, such as representative 442, to contact the user to confirm that the user intended to confirm the trip. Alternatively, if the user makes no further interactions with the application after confirming the trip and the vehicle is within 1 minute of reaching the pickup location, the application may send a notification to the server computing devices indicating the same. The server computing devices may then send a request to enable a customer service representative to contact the user to confirm that the user intended to confirm the trip. In some instances, if the customer service representative is not able to connect with the user (for instance via a phone call or other communication enabled by the application), it may be likely that the user's client computing device has run out of power. In such cases, the customer service representative may cause the vehicle to automatically unlock its doors once the vehicle has stopped in order to pick up the user (presumably at or near the pickup location).

In some instances, prior to the user confirming any of the set of potential trips, the server computing devices may automatically send instructions to an assigned vehicle to travel to the pickup location of one of the set of potential trips to pick up the user. This may be done, for instance, in response to a determination that an overall user score for the one of the set of potential trips meets a threshold value. For instance, an overall user score may be determined for each trip of the set of potential trips. Each overall user score may be determined by combining the aforementioned historical score for the user with a current context user score. For instance, the current user score may be determined based on various factors the cost of a ride (e.g., lower cost, higher score and vice versa), current availability or supply of vehicles (e.g., greater supply, greater score and vice versa), current demand for the vehicle (e.g., low demand, greater score and vice versa), whether there are other users with high historical user scores nearby that are also likely to request trips, the ETA for the vehicle to reach the pickup location (e.g., lower ETA, higher score, and vice versa), etc. As with the historical user scores, for the current context user score, the values representative of the various factors may be summed together as a scalar value or alternatively can be mathematically represented as arrays of numbers that output by some machine learning or heuristic models.

Whether there are other users with high historical user scores nearby that are also likely to request trips may be done on the basis of S2 cells. For instance, for a given S2 cell, if there are N sampled users with overall user scores of "X" value or greater than that cell as a whole, that user may be preferred by the service. An inverse correlation may also be performed between sample size and S2 cell size. This may be especially useful in dense urban areas, or for instance, a location including a large building (such as an office or condo building) full of high value users. This may allow for the identification of areas which include users with high historical user scores or rather areas having high probability of someone ordering a requesting a vehicle. This information may then be used to distribute, pre-position, and/or pre-assigned vehicles of the fleet to that cell for those trips.

The current context user score may be combined, for instance added, with the historical user score to determine the overall user score for each of the set of potential trips. For instance, the aforementioned scalar values may be added to determine an overall scalar value for the overall user score, or the values of the vectors may be added or otherwise combined to determine an overall scalar value for the overall user score. The overall user scores for each of the set of potential trips may then be compared to the threshold value. If the overall user score for a trip of the set of potential trips meets the threshold, the server computing devices may automatically send the aforementioned instructions to the assigned vehicle for the trip. Of course, if the user does not confirm the trip within a predetermined period of time, such as 30 seconds or more or less, or when the assigned vehicle is within a predetermined time or distance of the pickup location, such as 1 mile or 2 minutes or more or less, the server computing devices may send instructions to the assigned vehicle cancelling the trip.

Alternatively, rather than waiting for the user to confirm the trip, the server computing devices 410 may automatically arrange one of the potential trips (i.e. a highest ranked potential trip) by assigning and dispatching a vehicle to the potential pickup location for that one as described above. In this regard, the user could be required to cancel the trip (as shown in FIG. 7) rather than to confirm the trip. This could be done based on the overall user score meeting the threshold value or independent of any such user scores. For instance, a countdown timer could be displayed and/or a progress bar, and the user must cancel the trip once the time and/or progress bar is finished.

In some instances, the server computing devices may also generate and provide additional information with the set of potential trips to the client computing devices. For example, promotional and other types of information, such as a trip to RESTAURANT A right now would be discounted or have a relatively low cost to the user. For instance, the cost of the trip may be subsidized by a business owner or other representative. This information may also be personalized (e.g. the information may be generated based on a user's past trips to RESTAURANT A at similar times).

Although the example above relates to determining potential trips in response to receiving a notification from the user's client computing device regarding a status of the application, these determinations may also be determined periodically. For instance, the server computing devices may determine potential trips for each user of the service. The frequency of these determinations may change depending upon how often each user uses the service. For instance, the server computing devices might calculate potential trips more often for more frequent riders or for riders who have not recently used the service (i.e. taken trips). In addition or alternatively, the server computing devices may determine potential trips for higher value user more often than for other users. In addition or alternatively, the frequency of these determinations may be based on the current demand. For example, if demand is currently low or expected to be low in at some point in the future (e.g. vehicles are not serving or expected to be serving trip), for one or more vehicles in a particular are, the server computing devices might determine potential trips for people currently in (for instance, as provided by the application) or expected to be in those areas (for instance, given their calendar, previous habits, or other information).

The server computing devices may also determine user scores for each potential trip as described above. In such cases, if a determined user score for a trip meets a threshold value, the server computing devices may automatically send a notification to the user's client computing device indicating that a vehicle is available for the trip. The user may then confirm the trip as described above. In addition, if the server computing devices are able to identify potential trips with high value (for instance in terms of costs paid by users and/or positioning of vehicles), the server computing devices may automatically pre-dispatch vehicles that will have the best usage, such as trips that are likely to have a pickup as soon as the vehicle arrives at a particular location. This may thus allow the server computing devices to proactively suggest and enable trips without requiring the user to actually initiate anything.

In some instances, the user may receive a notification indicating that a vehicle is available for a trip via the user's client computing device from the server computing devices and may open the application via notification. In response, the client computing device by way of the application may send a second notification to the server computing devices. In such cases, the server computing devices may extend the time for which the server computing devices will wait for the user to confirm the trip or may hold an assigned vehicle exclusively for the user. Alternatively, even if the user does not interact with the notification to open the application, the server computing devices may still hold the assigned vehicle but do so for less time based on the user's historical and/or current user score (e.g. how 'good' of a user he or she appears to be) and the current level of demand for the vehicles (e.g. if demand is low, the server computing devices may hold the assigned vehicle for longer). These factors could be blended together as one score or used to a duration of time for which to reserve the car. In addition, in some instances, explicit interactions with notifications may be used to hone how the notification appears or it content in order to drive higher engagement, encourage ridership, and produce higher score users.

The features described herein may enable advanced trip planning for an autonomous vehicle service. Because the dispatching system may pre-assign an autonomous vehicle to the potential trip, this may enable the dispatching system to proactively suggest and enable trips without requiring users to actually initiate anything as well as to increase ridership, reduce estimated (and possibly actual) times of arrival for pickups and/or destinations (for drop offs), reduce "empty miles", increase demand for trips, and possibly reduce costs charged to user.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of advanced trip planning for an autonomous vehicle service, the method comprising:
   providing, by one or more processors of one or more server computing devices, trip information to a client computing device for display to a user;
   determining, by the one or more processors, a user score for a potential trip, wherein the potential trip starts from a potential pickup location and ends at a potential destination location;
   receiving, by the one or more processors from the client computing device, confirmation information identifying the potential trip; and
   sending, by the one or more processors, instructions to a vehicle in order to cause the vehicle to maneuver to the potential pickup location, wherein whether the instructions are sent before or after the confirmation information is received depends upon the determined user score.

2. The method of claim 1, further comprising selecting the potential trip from a set of potential trips based on the trip information.

3. The method of claim 2, wherein the trip information includes a first estimated time of arrival for the vehicle to reach the potential destination location.

4. The method of claim 3, wherein the user score is determined based on at least one of a historical user score for the user and a current user score for the user, the historical user score represents a past value for the user to the autonomous vehicle service, and the current user score represents a current value for the user to the autonomous vehicle service.

5. The method of claim 4, further comprising:
   determining the historical user score based on one or more of:
   a number of trips the user has taken,
   a number of reviews or other posts about the autonomous vehicle service,
   whether the user has incurred any costs to the autonomous vehicle service,
   how the user has interacted with an application of the autonomous vehicle service on the client computing device, or
   whether the user was on time for past pickups.

6. The method of claim 4, further comprising:
   determining the current user score based on one or more of:
   a cost of a ride,
   current availability of vehicles of a fleet of autonomous vehicles of the autonomous vehicle service, or
   current demand for the vehicles.

7. The method of claim 4, further comprising:
   comparing the user score to a threshold value, wherein whether the instructions are sent before or after the confirmation is received further depends on results of the comparing.

8. The method of claim 4, further comprising:
   receiving a notification that an application of the autonomous vehicle service has been closed within a predetermined period of time of the confirmation information being sent from the client computing device; and
   sending a request to enable a customer service representative to contact the user to confirm that the user intended to select the potential trip.

9. The method of claim 4, further comprising:
   receiving a notification that an application of the autonomous vehicle service has been closed within a predetermined period of time of the confirmation information being sent from the client computing device; and
   sending instructions to the vehicle in order to cancel the selected potential trip.

10. A server for performing advanced trip planning for an autonomous vehicle service, the server comprising:
    a memory configured to store data and instructions; and
    one or more processors coupled to the memory, the one or more processors being configured to:
    provide trip information to a client computing device for display to a user;
    determine a user score for a potential trip, wherein the potential trip starts from a potential pickup location and ends at a potential destination location;
    receive, from the client computing device, confirmation information identifying the potential trip; and
    send instructions to a vehicle in order to cause a vehicle to maneuver to a potential pickup location, wherein whether the instructions are sent before or after the confirmation information is received depends upon the determined user score.

11. The server of claim 10, wherein the one or more processors are further configured to select the potential trip from a set of potential trips based on the trip information.

12. The server of claim 11, wherein the trip information includes a first estimated time of arrival for the vehicle to reach the potential destination location.

13. The server of claim 12, wherein the user score is determined based on at least one of a historical user score for the user and a current user score for the user, the historical user score represents a past value for the user to the autonomous vehicle service, and the current user score represents a current value for the user to the autonomous vehicle service.

14. The server of claim 13, wherein the one or more processors are further configured to determine the historical user score based on one or more of:
    a number of trips the user has taken,
    a number of reviews or other posts about the autonomous vehicle service,
    whether the user has incurred any costs to the autonomous vehicle service,
    how the user has interacted with an application of the autonomous vehicle service on the client computing device, or
    whether the user was on time for past pickups.

15. The server of claim 14, wherein the one or more processors are further configured to determine the current user score based on one or more of:
    a cost of a ride,
    current availability of vehicles of a fleet of autonomous vehicles of the autonomous vehicle service, or
    current demand for the vehicles.

16. The server of claim 14, wherein the one or more processors are further configured to compare the user score to a threshold value, wherein whether the instructions are sent before or after the confirmation is received further depends on results of the comparing.

17. The server of claim 14, wherein the one or more processors are further configured to:
receive a notification that an application of the autonomous vehicle service has been closed within a predetermined period of time of the confirmation information being sent from the client computing device; and
send a request to enable a customer service representative to contact the user to confirm that the user intended to select the potential trip.

18. The server of claim 14, wherein the one or more processors are further configured to:
receive a notification that an application of the autonomous vehicle service has been closed within a predetermined period of time of the confirmation information being sent from the client computing device; and
send instructions to the vehicle in order to cancel the selected potential trip.

19. A non-transitory recording medium on which instructions are stored, the instructions when executed by one or more processors, cause the one or more processors to perform a method of advanced trip planning for an autonomous vehicle service, the method comprising:
providing trip information to a client computing device for display to a user;
determining a user score for a potential trip, wherein the potential trip starts from a potential pickup location and ends at a potential destination location;
receiving confirmation information identifying the potential trip; and
sending instructions to a vehicle in order to cause the vehicle to maneuver to the potential pickup location, wherein whether the instructions are sent before or after the confirmation information is received depends upon the determined user score.

20. The non-transitory recording medium of claim 19, further comprising selecting the potential trip from a set of potential trips based on the trip information.

* * * * *

UNITED STATES PATENT AND TRADEMARK OFFICE
CERTIFICATE OF CORRECTION

PATENT NO. : 11,835,348 B2
APPLICATION NO. : 17/703628
DATED : December 5, 2023
INVENTOR(S) : Ben Qingzhou Wang et al.

It is certified that error appears in the above-identified patent and that said Letters Patent is hereby corrected as shown below:

In the Claims

Claim 7, Column 20, Lines 3 and 4:
Now reads: "the confirmation is received"; should read -- the confirmation information is received --

Claim 16, Column 21, Line 4:
Now reads: "the confirmation is received"; should read -- the confirmation information is received --

Signed and Sealed this
Twenty-third Day of January, 2024

Katherine Kelly Vidal
*Director of the United States Patent and Trademark Office*